US011916340B2

(12) United States Patent
Gruber et al.

(10) Patent No.: US 11,916,340 B2
(45) Date of Patent: Feb. 27, 2024

(54) ELECTRICAL PLUG CONNECTOR, CONNECTING ELEMENT, AND PRINTED CIRCUIT BOARD ARRANGEMENT

(71) Applicant: Rosenberger Hochfrequenztechnik GmbH & Co. KG, Fridolfing (DE)

(72) Inventors: Andreas Gruber, Ainring (DE); Johannes Heubeck, Fridolfing (DE); Christian Dandl, Fridolfing (DE)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 11 days.

(21) Appl. No.: 17/505,898

(22) Filed: Oct. 20, 2021

(65) Prior Publication Data

US 2022/0123512 A1 Apr. 21, 2022

(30) Foreign Application Priority Data

Oct. 20, 2020 (EP) .................................... 20202798

(51) Int. Cl.
*H01R 24/50* (2011.01)
*H01R 13/05* (2006.01)

(52) U.S. Cl.
CPC ........... *H01R 24/50* (2013.01); *H01R 13/052* (2013.01)

(58) Field of Classification Search
CPC .. H01R 24/50; H01R 13/052; H01R 2103/00; H01R 12/7082; H01R 12/73; H01R 12/91; H01R 24/542; H01R 12/57; H01R 13/05; H01R 13/40
See application file for complete search history.

(56) References Cited

U.S. PATENT DOCUMENTS

| | | | | |
|---|---|---|---|---|
| 6,224,421 | B1 * | 5/2001 | Maturo, Jr. ........ | H01R 13/6315 439/247 |
| 6,231,352 | B1 | 5/2001 | Gonzales | |
| 6,497,579 | B1 * | 12/2002 | Garbini .............. | H01R 13/6315 439/246 |
| 9,735,521 | B2 | 8/2017 | Zhu | |
| 11,296,465 | B2 * | 4/2022 | Gruber ................. | H01R 13/627 |
| 2004/0102061 | A1 * | 5/2004 | Watanabe .............. | H01R 24/50 439/63 |

(Continued)

FOREIGN PATENT DOCUMENTS

| | | | |
|---|---|---|---|
| EP | 2490304 | A2 | 8/2012 |
| JP | 2018085335 | A | 5/2018 |
| WO | 2013072011 | A1 | 5/2013 |

OTHER PUBLICATIONS

European Search Report dated Mar. 18, 2021.

*Primary Examiner* — Abdullah A Riyami
*Assistant Examiner* — Nelson R. Burgos-Guntin
(74) *Attorney, Agent, or Firm* — Randall Danskin P.S.

(57) ABSTRACT

The invention relates to an electrical plug connector having an outer conductor contact element with a plurality of elastic spring tabs and a dielectric support element. The spring tabs are arranged, with a respective rear end, annularly around the longitudinal axis (L) of the plug connector and are fastened indirectly or directly to an electrical device. It is provided that the spring tabs are supported with a respective front, free end section laterally on the dielectric support element, wherein the dielectric support element is displaceable laterally relative to the electrical device.

23 Claims, 8 Drawing Sheets

(56) References Cited

U.S. PATENT DOCUMENTS

| | | | | | |
|---|---|---|---|---|---|
| 2009/0149086 | A1* | 6/2009 | Dahms | H01R 24/50 | 439/835 |
| 2009/0211808 | A1* | 8/2009 | Falk | H01R 24/44 | 29/883 |
| 2012/0295478 | A1* | 11/2012 | Mrowka | H01R 24/50 | 439/578 |
| 2013/0237070 | A1* | 9/2013 | Wehrle | H01R 13/64 | 439/83 |
| 2014/0030915 | A1* | 1/2014 | Perrin | H01R 12/73 | 439/578 |
| 2015/0118899 | A1* | 4/2015 | Hugel | H01R 9/0515 | 439/578 |
| 2015/0180150 | A1* | 6/2015 | Shinder-Lerner | H01R 24/50 | 439/252 |
| 2015/0270635 | A1* | 9/2015 | Wollitzer | H01R 24/50 | 439/675 |
| 2016/0141784 | A1* | 5/2016 | Hashiguchi | H01R 24/50 | 439/733.1 |
| 2018/0269604 | A1 | 9/2018 | Lee | | |
| 2018/0301829 | A1* | 10/2018 | Hoyack | H01R 12/73 | |
| 2018/0301834 | A1* | 10/2018 | Dandl | H01R 13/20 | |
| 2018/0366844 | A1* | 12/2018 | Beganovic | H01R 24/50 | |
| 2019/0036240 | A1* | 1/2019 | Imtiaz | H01R 13/6277 | |
| 2019/0157778 | A1* | 5/2019 | Barthelmes | H01R 13/6582 | |
| 2019/0165525 | A1* | 5/2019 | Gartmann | H01R 12/91 | |
| 2019/0280439 | A1* | 9/2019 | Ni | H01R 13/2421 | |
| 2019/0372248 | A1* | 12/2019 | Schaeuble | H01R 12/716 | |
| 2020/0014087 | A1* | 1/2020 | Zebhauser | H01P 5/103 | |
| 2021/0151943 | A1* | 5/2021 | Zushi | H01R 12/721 | |
| 2021/0265788 | A1* | 8/2021 | Smith | H01R 13/622 | |
| 2021/0265789 | A1* | 8/2021 | Smith | H01R 13/622 | |
| 2022/0109275 | A1* | 4/2022 | Wild | H05K 1/182 | |
| 2022/0123512 | A1* | 4/2022 | Gruber | H01R 12/91 | |

* cited by examiner

ELECTRICAL PLUG CONNECTOR, CONNECTING ELEMENT, AND PRINTED CIRCUIT BOARD ARRANGEMENT

CROSS-REFERENCE TO RELATED APPLICATIONS

This US National Stage Utility Patent Application claims priority to European Patent Application No. EP 20 202 798,3 which was filed on 20 Oct. 2020. The entire contents of the aforementioned European Patent Application is expressly and fully incorporated herein by this reference.

Pursuant to USPTO rules, this priority claim to earlier filed European Patent Application No. EP 20 202 798,3 which was filed on 20 Oct. 2020, is also included in the Application Data Sheet (ADS) filed herewith.

TECHNICAL FIELD

The invention relates to an electrical plug connector having an outer conductor contact element with a plurality of elastic spring tabs and a dielectric support element.

BACKGROUND

Electronic systems generally have electronic circuits which are implemented on printed circuit boards (PCBs) by interconnecting a plurality of electronic components. A plurality of printed circuit boards are often provided within a common electronic system in order to distribute the circuits, for example, spatially in a housing or in order to connect together different modules of a modular system. In this design, an electrical connection is generally required between the different printed circuit boards for signal and/or energy exchange.

In order to connect two printed circuit boards together, printed circuit board plug connectors are often used which are electrically and mechanically connected to the respective printed circuit board, for example directly (as a "two-part" board-to-board connection). An additional connecting element (also known by the terms "adapter" or "bullet") can optionally also be inserted between the two printed circuit board plug connectors, as a result of which a "three-part" board-to-board connection is provided. The said printed circuit board plug connectors or board-to-board connectors are often designed to compensate a radial misalignment, a rotational misalignment, an angular misalignment, and/or a misalignment in the spacing between the two printed circuit boards.

A plug connector for compensating a rotational and radial misalignment is proposed, for example, in EP 2 490 304 A2. The plug connector from EP 2 490 304 A2 has a contact element, for example an outer conductor contact element, which is formed from loop-like structures. The outer conductor contact element is twisted helically in the sections provided for contacting a mating plug connector in order to enable a sufficient contact pressure. In contrast, the outer conductor contact element is provided in a central section with turns running orthogonally to the helical turns in order to provide the ability to compensate a potential misalignment when performing a blind plugging procedure.

However, the known plug connectors have various problems. On the one hand, a contact element with complex turns of this type, as proposed for example in EP 2 490 304 A2, is relatively complex to produce. Moreover, the known plug connectors generally have insufficient mechanical stability when plugged in. Lastly, the plug connector from EP 2 490

304 A2 is also suited only to a limited extent for use in high-frequency engineering and takes up a relatively large amount of space along its longitudinal axis owing to its complex structure of turns along its axial extent.

Taking the prior art into consideration, the object of the present invention consists in providing an electrical plug connector which allows a misalignment between electrical devices to be compensated, preferably simultaneously with high mechanical stability and advantageous electrical properties.

The object is achieved for the electrical plug connector with the features presented herein and in the accompanying Claims. The features described below relate to advantageous embodiments and alternative embodiments of the invention.

An electrical plug connector is provided, in particular for producing an electrical and mechanical connection between a first electrical device (preferably a first printed circuit board) associated with the plug connector and a second electrical device (preferably a second printed circuit board). The plug connector is preferably connected electrically and mechanically to the first device and can be connected to a further plug connector (for example, the connecting element described below or a corresponding mating plug connector) associated with the second device.

The plug connector according to the invention has an outer conductor contact element with a plurality of elastic spring tabs and a dielectric support element.

The deformability or the elasticity of the spring tabs can be chosen in such a way that a sufficient radial contact force can be provided to produce a mechanically stable electrical connection to a corresponding mating plug connector, for which the spring tabs are able to bend sufficiently reversibly (and also for the compensation of misalignment described below), but without undergoing an irreversible plastic deformation. However, in special cases, for example in the event of a need to compensate a particularly large tolerance, plastic deformation of the spring tabs can also be provided.

According to the invention, it is provided that the spring tabs are arranged, with a respective rear end, annularly and in a circle around the longitudinal axis of the plug connector and are fastened indirectly or directly to an electrical device (in particular the abovementioned first electrical device, preferably a first printed circuit board) or are configured so that they can be fastened indirectly or directly to an electrical device. The spring tabs are furthermore supported with a respective front, free end section laterally on the dielectric support element.

The said "end section" is preferably an axial section along the longitudinal axis of the respective spring tab which extends from the front end of the spring tab over a certain axial length, for example over a length of up to 50% of the total length of the spring tab, preferably over a length of up to 40% of the total length of the spring tab, particularly preferably over a length of up to 30% of the total length of the spring tab, more preferably over a length of up to 20% of the total length of the spring tab, but for example only over a length of up to 10% of the total length of the spring tab or less, for example up to 5%, up to 4%, up to 3%, or up to 2%.

Where reference is made in the scope of the present invention to the specification "front" and "rear", the specification "front" refers to that plug-side end of the plug connector which is provided for connecting to the mating plug connector, and the specification "rear" refers to the plug-side end remote from the front end, for example the end of the plug connector for connecting to the electrical device.

According to the invention, it is provided that the support element can be displaced laterally relative to the electrical device and is configured in order to be displaceable laterally relative to the electrical device. The support element can in particular be displaceable laterally relative to the rear end of the plug connector.

Lateral displacement is understood in the present case to mean displacement of the support element in which the center axis of the support element is displaced relative to the electrical device or to the rear end of the plug connector, in particular therefore displacement between the center axis of the support element and the longitudinal axis of the plug connector. It can be provided that the support element is tilted at least slightly during the lateral displacement. However, exclusively parallel displacement of the support element relative to the electrical device or the rear end of the plug connector is preferably provided.

The support element is preferably not mechanically fixed to the electrical device and/or to the rear end of the plug connector and/or to the rear end of the spring tabs. The support element can be axially spaced apart, for example, from the electrical device, the rear end of the plug connector, and/or the rear end of the spring tabs. It can, for example, be provided that the support element extends exclusively along the front end section of the spring tabs.

A self-centering design of a plug connector can advantageously be provided.

Because the plug connector according to the invention for supporting the front end sections of the spring tabs has the dielectric support element which is displaceable relative to the electric device, the outer conductor contact element can have a high elasticity for compensating a misalignment between the plug connector and the mating plug connector (in particular, a low bending strength in the lateral direction), wherein the plug connector simultaneously maintains a high mechanical stability owing to the supporting function of the support element and the fastening of the rear end of the spring tabs to the electrical device.

The dielectric support element can preferably move in a "floating" fashion between the front end sections of the spring tabs. In this way, particularly stable mechanical guidance with simultaneous compensation of misalignment can be provided. In the case of a lateral misalignment or a radial misalignment between the devices to be connected together, for example printed circuit boards, the spring tabs which are under greater stress owing to the misalignment can displace the dielectric support element and consequently press the less stressed spring tabs and the optionally present inner conductor contact element into the central position.

A radial misalignment between the longitudinal axes of the plug connectors involved in the plug connection, a rotational misalignment between the plug connectors involved in the plug connection, an angular misalignment between the longitudinal axes of the plug connectors involved in the plug connection, and/or a misalignment in the spacing between the devices (for example, printed circuit boards) connected together by the plug connectors involved can preferably be compensated.

It should be mentioned at this point that the plug connector can advantageously be suited for connecting any electrical devices. Although the connection of two printed circuit boards is a particularly preferred field of application, the plug connector can, for example, also be used for connecting electrical cables (in particular when at least one of the cables is fixed to a housing component) or for connecting housing parts of an electrical module, for example a filter module. The connection of, for example, a printed circuit board to a cable or a module can also be provided. In principle, any combinations of electrical devices to be connected together can be produced. It can in particular also be provided to arrange a plurality of plug connectors according to the invention in a common multiple connector.

The plug connector can be a plug connector of any plug connector type. An electrical plug connector for use in high-frequency engineering (HF plug connector) is particularly preferably provided. The plug connector can in particular be designed to transmit signals in the MHz to THz range, for example to transmit signals of 1 MHz to 100 GHz, preferably 5 MHz to 70 GHz. The plug connector can, however, also be used to transmit electrical DC signals, for example to supply energy. A higher-level signal transmission system can in particular also be provided, according to which a HF signal is modulated to a DC signal.

The outer conductor contact element can be formed as a single piece (for example, by a spring cage described below) or multiple pieces (for example, by individual, separate spring tabs).

The outer conductor contact element is preferably fixed mechanically to the electrical device, in particular a printed circuit board.

In a preferred development of the invention, it can be provided that the spring tabs are supported with their respective front, free end section laterally on an outer shell of the dielectric support element. The spring tabs can thus advantageously be supported on the lateral outer surface of the support element. It can, however, also be provided that the spring tabs are supported with their respective front, free end section inside the support element, for example in lateral bores, grooves, and/or recesses which run along the longitudinal axis of the support element.

In an advantageous embodiment of the invention, it can be provided that the outer conductor contact element is formed as a spring cage. The spring cage is preferably fastened directly or indirectly to the electrical device, for example via one or more contact surfaces or soldering surfaces.

The spring tabs can preferably start from an annular base of the spring cage with their respective rear end.

A mechanically particularly stable outer conductor contact element can be provided by a spring cage and the attachment of the rear ends of the spring tabs to the base of the spring cage.

The rear ends of the spring tabs are particularly preferably formed as a single piece with a common connecting region, in particular a connecting surface, or merge into the common connecting region.

The spring tabs can be connected together at their rear ends in the manner of a sleeve and be arranged around a common center axis.

It can, however, also be provided that the spring tabs are fastened with their rear ends respectively individually or in groups directly to the electrical device. For example, the spring tabs can be fastened to a common connecting surface or to a plurality of connecting surfaces (for example, a contact surface or a soldering surface) of the electrical device, for example a printed circuit board or a housing component.

It can furthermore be provided that the spring tabs are fastened with their rear ends respectively individually or in groups to a further component for indirect connection to the electrical device. The spring tabs can, for example, be fastened to a common connecting surface or to a plurality of connecting surfaces of the connecting element described below, wherein the connecting element is preferably fastened to one or both of the electrical devices via the fixing plate mentioned below. Fastening of the spring tabs to an insulating element, for example the insulating body mentioned below, can furthermore also be provided.

The rear ends of the spring tabs are fastened, preferably by being materially bonded (in particular soldered or welded), on the connecting surface.

The rear ends of the spring tabs can in principle be fastened to the electrical device using any force-fitting, form-fitting, and/or material-bonding connecting technology, respectively indirectly via one or more further components or preferably directly.

According to a development of the invention, it can be provided that the spring tabs are fastened with their respective rear end on an insulating body accommodated in the outer conductor contact element.

The insulating body can preferably be connected mechanically to the electrical device, in particular the printed circuit board.

The spring tabs can be mechanically connected together with their rear ends by the insulating body, in particular when the insulating body forms the common support surface. Alternatively, the insulating body can additionally support the spring tabs at their rear ends, in other words further improve, for example, the mechanical stability of a spring cage. The insulating body can thus form a common connecting region for connecting the rear ends of the spring tabs, but may also fulfill only a supplementary supporting function. The insulating body can advantageously improve the mechanical stability of the plug connector. The insulating body can advantageously be used to indirectly connect the spring tabs to the electrical device. The insulating body can be fastened to the electrical device in a form-fitting, force-fitting, and/or materially bonded fashion.

The insulating body is preferably accommodated axially in the outer conductor contact element. The dielectric support element is also preferably axially accommodated in the outer conductor contact element.

The insulating body can be spaced apart from the support element along the longitudinal axis of the plug connector. The support element is preferably not mechanically connected to the insulating body but is displaceable laterally, preferably parallel, relative to the insulating body.

The insulating body and/or the support element are preferably fixed in the outer conductor contact element, in particular fixed in a force-fitting and/or form-fitting fashion (axially or so that they are secured against being pulled out and/or radially and/or so that they are secured against rotation or twisting).

The insulating body can have web-like latching elements, for example latching lugs, which can be inserted into corresponding latching recesses of the outer conductor contact element in order to enable radial and/or axial and/or rotational and/or twist-proof fixing of the outer conductor contact element on the insulating body.

The insulating body can optionally have fastening means for fastening to the electrical device. The insulating body can serve to fix the plug connector to, for example, a printed circuit board, a housing component, or a cable.

The insulating body can have a guide duct (or a plurality of guide ducts) for the at least one inner conductor contact element described below.

In order to enable simple mounting of the at least one inner conductor contact element in the insulating body, the insulating body can optionally be formed from multiple pieces, in particular two pieces. The production of the insulating body as an injection-molded part can also be provided.

According to a development of the invention, it can be provided that the respective front end sections of the spring tabs are bent in the direction of the rear end.

The spring tabs can be bent, for example, by between 90° and 180°, preferably by between 120° and 180°, particularly preferably by between 150° and 180°, more preferably by between 170° and 180°. The spring tabs can, however, also optionally be bent by less than 90° or by more than 180°. The spring tabs are preferably bent by 180° or at least by approximately 180°.

The spring tabs can have precisely one but also a plurality of bending points with different bending radii along the front end section. Sections running in a straight line can also be provided between a plurality of bending points.

Preferably all the spring tabs are bent. It can, however, optionally also be provided that only individual spring tabs are bent. For example, a first group of spring tabs can be bent and a second group of spring tabs not bent or bent in the opposite direction.

In a development of the invention, it can be provided that the respective front end sections are bent so that they face away from the longitudinal axis of the plug connector ("outward"). It can, however, also be provided that the respective front end sections are bent in the direction of the longitudinal axis of the plug connector ("inward"), wherein the spring tabs can in particular in this case (preferably but not compulsorily) be turned down over the support element.

Bending of the front end section of the spring tabs in the direction of the rear end of the spring tabs can allow a particularly good optimization possibility for the contact pressure. The contact pressure can be optimized by the geometry of the bent section, in particular by the width of the spring tabs, the thickness of the spring tabs, and/or the length of the spring tabs and the spring travel of the bent section of the spring tabs At the same time, the geometry of the unbent section of the spring tabs can be optimized in terms of the width of the spring tabs, the thickness of the spring tabs, and the length of the spring tabs and by the spring travel of the unbent section of the spring tabs with respect to a slight radial movement for the purpose of compensating misalignment, without there being any trade-off between contact pressure and elasticity for the purpose of compensating misalignment, as is the case for the plug connectors of the prior art.

In a development of the invention, it can be provided that the support element has laterally arranged passages, in particular passages which are arranged distributed along its outer shell and in which the respective front end sections of the spring tabs are received.

Particularly good supporting and guidance of the spring tabs on their front end section can be provided by the passages.

The passages can be formed as bores, material recesses, or grooves or between spoke- or web-like raised portions on the outer shell. The spoke- or web-like raised portions can optionally have indentations or undercuts in order to provide a form-fitting receptacle for the spring tabs.

In a development of the invention, it can be provided that the plug connector has one or more stop elements in order to predetermine a maximum deflection for the support element and the spring tabs.

The stop elements are preferably formed by the raised portions projecting laterally from the support element and/or the guide bodies described below. In this way, an end stop can be provided for the lateral displacement of the support element inside an outer conductor of a mating plug connector.

It can alternatively or additionally be provided that the stop elements are formed by limiting elements which are arranged on an end side, facing the support element, of the insulating body and/or which are arranged on an end side, facing the insulating body, of the support element. In this way, an end stop for the lateral displacement of the support element relative to the insulating body can be provided.

The support element can thus be formed in order to provide a radial end stop between the plug connector and the corresponding mating plug connector. As a result, it is possible to prevent overloading of the spring tabs.

In an advantageous development of the invention, it can be provided that the respective front end sections of the spring tabs have recesses by means of which the front end sections are hooked into respective guide bodies projecting laterally from the support element. The guide bodies preferably project as raised portions from the outer shell of the support element and can, for example, be formed in the manner of pins, bolts, or plates (in principle, any cross-section can be provided).

The guide bodies can protrude from the recesses of the spring tabs. Mechanical play can optionally be provided between the guide bodies and the recess, in particular if the guide bodies are latched into the recesses. The guide bodies can, however, also be pressed or latched into the recesses with no play.

In order to facilitate assembly, the guide bodies can optionally have bevels, other types of chamfered edges, and/or a conical taper in order to facilitate introduction or latching into the recesses.

In a development of the invention, it can be provided that the spring tabs form a straight profile, a curved profile, or a stepped profile between the front end section and the rear end.

A straight profile of the spring tabs can enable particularly economical production. Moreover, straight spring tabs enable better and simpler electrical customization. In a simple alternative embodiment, the outer conductor contact element or the spring cage can be formed as a slotted tube.

Nevertheless, the optimization possibilities with respect to elasticity and compensation of misalignment can be improved with a curved or stepped profile of the spring tabs, which is why a curved or stepped profile is generally preferred.

In an advantageous development of the invention, it can be provided that the spring tabs form a twisted profile along its longitudinal extent. The twisted profile can extend, for example, along the front end section, run from the rear end of the spring tabs, or be formed between the front end section and the rear end.

Twisting in the longitudinal direction of the spring tabs can enable comfortable adjustment of the contact pressure. For this purpose, the torsional strength of the spring tab can be varied depending on the torsional moment of inertia of the spring tab and the shear modulus of the material. At the same time, the bending strength of the spring tab can be optimized depending on the modulus of elasticity of the spring tab and the geometrical moment of inertia of the spring tab in order to determine the radial bend for the purpose of compensating misalignment.

In a particularly preferred development of the invention, it can be provided that the plug connector has at least one inner conductor contact element which extends through the outer conductor contact element and through the support element (and optionally through the insulating body).

The inner conductor contact element is preferably guided coaxially inside the outer conductor contact element.

In principle, any number of inner conductor contact elements can be provided, for example precisely one inner conductor contact element (preferred), two inner conductor contact elements, three inner conductor contact elements, four inner conductor contact elements, five inner conductor contact elements, six inner conductor contact elements, seven inner conductor contact elements, eight inner conductor contact elements, or even more inner conductor contact elements.

It should be mentioned at this point that the "outer conductor" part of the term "outer conductor contact element" is not to be understood as implying that an inner conductor contact element is necessarily provided. The plug connector may also have just a single conductor (the outer conductor contact element).

In an advantageous development of the invention, it can be provided that the inner conductor contact element is formed as a flat contact. In this way, elasticity in a first spatial direction can be provided.

The inner conductor contact element, in particular an inner conductor contact element formed as a flat contact, can optionally form a twisted profile along its longitudinal extent. The inner conductor contact element is preferably twisted by 90°.

Owing to the design of the inner conductor contact element as a flat contact and the twisting along the longitudinal axis, the inner conductor contact element can preferably enable elasticity in both lateral dimensions. Owing to the twisting, a particularly advantageous articulated connection can result in particular when the twisting runs along an axial section that is as short as possible and/or is as adjacent as possible to that end of the inner conductor contact element which faces the printed circuit board. The twisting can preferably also be arranged adjacent to a bending point of an angled inner conductor contact element.

In an advantageous development of the invention, it can be provided that the spring tabs and the at least one inner conductor contact element are twisted in the same direction of rotation. The twists of the inner conductor contact element and the spring tabs preferably extend over the same axial length or approximately the same length and/or run along the longitudinal axis of the plug connector along the same axial section (as far as possible).

In this way, the electric field rotated by the twisted inner conductor contact element can be entrained on the twisted outer conductor contact element. The transmission properties of the plug connector can consequently be improved.

As an alternative to being designed as a flat contact, the inner conductor contact element can, however, in principle have any form, for example a pin contact or a socket contact. When designed as a socket contact, the inner conductor contact element can preferably be formed from two contact springs arranged opposite each other and between which an inner conductor of the mating plug connector can be introduced, for example a pin-shaped or flat inner conductor of the mating plug connector.

The design of the inner conductor contact element as a socket contact can be preferred in order to prevent unintended damage to the inner conductor contact element because a socket contact generally does not project from the plug connector and instead is protected by the outer conductor contact element of the plug connector.

The plug connector according to the invention is in principle suited for any application in the whole field of electrical engineering. In particular, however, communications technology, satellite technology, radio technology, and radar technology, especially mobile telephony, are particularly advantageous fields of application of the invention. Possible applications of the invention can relate to, for example, so-called “remote radio heads” (RRHs) or “remote radio units” (RRUs) or other active components of a mobile telephony system.

The invention also relates to a connecting element for producing an electrical and mechanical connection between two electrical devices, in particular between two printed circuit boards. The connecting element has a first end and a second end, wherein a plug connector according to the embodiments above and below is formed at each of the ends in order to connect the respective end to a mating plug connector of the device associated with this end.

This connecting element is in particular a connecting element for connecting two printed circuit boards (also known as an “adapter” or “bullet”).

The connecting element preferably has a central section between its two ends, wherein the central section is preferably formed in the manner of a sleeve. The connecting element preferably has a rigid or non-elastic form in its central section (in particular in such a way that the central section does not provide any possibility of elasticity-related compensation of misalignment between the electrical devices). The possibility of compensation of misalignment between the electrical devices is preferably provided only in the region of the first end and/or the second end of the connecting element.

The outer conductor contact elements of the two plug connectors of the connecting element are preferably formed as a single piece, for example are connected together along the central section. The inner conductor contact elements of the two plug connectors of the connecting element are also preferably correspondingly formed as a single piece. The optionally present insulating body of the two plug connectors can also correspondingly be formed as a single piece.

The connecting element preferably has plug connectors of an identical plug connector type at both of its ends. However, different types of plug connector can also in principle be provided at the two ends of the connecting element.

The invention also relates to a plug connection having a plug connector according to the embodiments above and below and to a mating plug connector which can be connected to the plug connector.

The proposed plug connection is advantageously capable of compensating a misalignment between electrical devices which are to be connected together.

The mating plug connector is preferably formed as a printed circuit board plug connector.

The mating plug connector preferably has a sleeve-like outer conductor. The outer conductor of the mating plug connector is here preferably shaped like a bell and has a guide funnel for the plug connector.

The mating plug connector preferably has at least one inner conductor. The inner conductor can be designed in any manner, for example from two opposite contact springs between which the inner conductor contact element of the plug connector can be introduced. The inner conductor of the mating plug connector can, however, also be formed as a flat contact or pin contact.

The invention furthermore relates to an electrical arrangement, in particular a printed circuit board arrangement. The arrangement has a first electrical device, preferably a first printed circuit board, and a second electrical device, preferably a second printed circuit board, electrically and mechanically connected to the first device.

Depending on the application, the plug connection can be suited for connecting any electrical devices, in particular when it is envisaged to join or plug the electrical devices together blind or when the connection is relatively subject to tolerances. Misalignment of external forced guidance of the plug connection can advantageously be compensated. Static over determination can advantageously be avoided.

The two electrical devices (in particular printed circuit boards) can in particular be connected together using three alternative embodiments according to the invention.

According to a first alternative embodiment, the electrical devices form, for their connection, a common plug connection according to the embodiments above and below, wherein one of the two devices has the plug connector and the other device has the mating plug connector (these alternative embodiments may also be referred to as a “two-part printed circuit board plug connection”).

According to a second alternative embodiment, the two devices are connected together by means of a connecting element according to the embodiments above and below, wherein each of the two devices has one of the mating plug connectors for connection to one of the plug connectors of the connecting element (this and the following alternative embodiment may also be referred to as a “three-part printed circuit board plug connection”).

According to a third alternative embodiment, the electrical devices each have a plug connector according to the embodiments above and below which are connected electrically and mechanically by a connector module, wherein the connector module has a first end and a second end, and wherein a mating plug connector, which is connected to one of the plug connectors, is arranged at each of the two ends. The mating plug connector preferably has an outer conductor which is formed as a rigid sleeve and, in a particularly preferred embodiment, has a guide funnel in order to facilitate plugging together with the plug connector. The connector module is preferably formed as a rigid, non-elastic component.

A board-to-board connection can advantageously be provided with compensation of a radial misalignment between the longitudinal axes of the printed circuit board plug connectors of the two printed circuit boards.

In contrast with the known misalignment-compensating printed circuit board plug connections of the prior art in which the connecting element (“bullet”) is tilted between the two plug connectors owing to the misalignment compensation, in the present case tilting can be avoided by the support element which is mounted in floating fashion in the outer conductor contact element.

In an advantageous development of the invention, it can be provided that the connecting element or the connector module is fixed in a central section between its two ends relative to the first electrical device (in particular to the first printed circuit board) and/or to the second electrical device (in particular to the second printed circuit board). In this way, the spring tabs can be fastened indirectly to the first and/or second electrical device via the central section of the connecting element.

The electrical arrangement (in particular the printed circuit board arrangement) preferably has a fixing plate, with a through bore, fixed relative to the first device/ printed circuit board and/or to the second device/ printed circuit board, wherein the connecting element or the connector module is guided through the through bore.

Features which have been described in connection with one of the subjects of the invention, namely those provided by the plug connector, the connecting element, the plug connection, and the printed circuit board arrangement, can also advantageously be applied for the other subjects of the invention. Likewise, advantages which have been described in connection with one of the subjects of the invention can also be understood as being relevant for the other subjects of the invention.

It should in addition be pointed out that terms such as "comprising", "having", or "with" do not exclude other features or steps. Moreover, terms such as "a" or "the" which indicate a singular step or feature do not exclude multiple features or steps, and vice versa.

Terms such as "first" or "second" etc. are used primarily for the purpose of being able to distinguish between respective device or method features and are not necessarily intended to indicate that features are mutually dependent or are related to one another.

The values and parameters described in the present case include deviations or fluctuations of ±10% or less, preferably ±5% or less, more preferably ±1% or less, and very particularly preferably ±0.1% or less of the respective mentioned value or parameter as long as these deviations are not practically excluded in the implementation of the invention. The specification of ranges by start and end values also comprises all those values and fractions which are included by the respective said range, in particular the start and end values and a respective mean value.

SUMMARY

An electrical plug connector, connecting element and printed circuit board arrangement generally provides an outer conductor contact element, a plurality of spacedly arrayed elastic spring tabs, a dielectric support element.

A principal aspect of the present invention is an electrical plug connector (1) having an outer conductor contact element (4) with a plurality of elastic spring tabs (5) and a dielectric support element (9), wherein the spring tabs (5) are arranged, with a respective rear end (6), annularly and in a circle around the longitudinal axis (L) of the plug connector (1) and are fastened indirectly or directly to an electrical device (2, 3), and wherein the spring tabs (5) are supported with a respective front, free end section (10) laterally on the dielectric support element (9), and wherein the support element (9) is configured to be displaceable laterally relative to the electrical device (2, 3).

A further aspect of the present invention is an electrical plug connector (1), characterized in that the spring tabs (5) are supported with their respective front, free end section (10) laterally on an outer shell (11) of the dielectric support element (9).

A further aspect of the present invention is an electrical plug connector (1), characterized in that the spring tabs (5) are fastened with their respective rear end (6) on an insulating body (19) accommodated in an outer conductor contact element (4), wherein the insulating body (19) preferably has web-like latching elements which can be inserted into corresponding latching recesses of the outer conductor contact element (4) in order to enable radial, rotational, and/or axial fixing of the outer conductor contact element (4) on the insulating body (19).

A further aspect of the present invention is an electrical plug connector (1), characterized in that the respective front end sections (10) of the spring tabs (5) are bent in the direction of the rear end (6), wherein the respective front end sections (10) are preferably (a) bent so they face away from the longitudinal axis (L) of the plug connector (1); or (b) bent in the direction of the longitudinal axis (L) of the plug connector (1), wherein the spring tabs (5) are preferably turned down over the support element (9).

A further aspect of the present invention is an electrical plug connector (1), characterized in that the support element (9) has laterally arranged passages (12) in which the respective front end sections (10) of the spring tabs (5) are received.

A further aspect of the present invention is an electrical plug connector (1), characterized in that the spring tabs (5) form a twisted profile along its longitudinal extent.

A further aspect of the present invention is an electrical plug connector (1), characterized in that the respective front end sections (10) of the spring tabs (5) have recesses (27) by means of which the front end sections (10) are hooked into respective guide bodies (26) projecting laterally from the support element (9).

A further aspect of the present invention is an electrical plug connector (1), characterized in that the spring tabs (5) form a straight profile, a curved profile, or a stepped profile between the front end section (10) and the rear end (6).

A further aspect of the present invention is an electrical plug connector (1), characterized by at least one inner conductor contact element (15) which extends through the outer conductor contact element (4) and the support element (9), wherein the inner conductor contact element (15) forms a twisted profile along its longitudinal extent.

A further aspect of the present invention is an electrical plug connector (1), characterized in that the spring tabs (5) and the at least one inner conductor contact element (15) are twisted in the same direction of rotation.

A further aspect of the present invention is an electrical plug connector (1) characterized by one or more stop elements in order to predetermine a maximum deflection for the support element (9) and the spring tabs (5), wherein the stop elements a) are formed by raised portions (13) projecting laterally from the support element (9) and/or guide bodies (26) which form an end stop can be provided for the lateral displacement of the support element (9) inside an outer conductor (23) of a mating plug connector (22); and/or (b) by limiting elements (37) which are arranged on an end side, facing the support element (9), of the insulating body (19) and/or which are arranged on an end side, facing the insulating body (19), of the support element (9), and form an end stop for the lateral displacement of the support element (9) relative to the insulating body (19).

A further aspect of the present invention is a connecting element (30) for producing an electrical and mechanical connection between two electrical devices (2, 3), having a first end (32) and a second end (33), wherein an electrical plug connector (1) according to one of claims 1 to 11 is formed at each of the two ends (32, 33) in order to connect the respective end (32, 33) to an electrical mating plug connector (22) of the electrical device (2, 3) associated with this end (32, 33).

A further aspect of the present invention is an electrical plug connection (21) having an electrical plug connector (1) and an electrical mating plug connector (22) which can be connected to the plug connector (1).

A further aspect of the present invention is a printed circuit board arrangement (31) having a first electrical printed circuit board (2) and a second electrical printed circuit board (3) connected electrically and mechanically to the first electrical printed circuit board (2), wherein the two printed circuit boards (2, 3) (a) form a common electrical plug connection (21) according to claim 13 for their connection, wherein one of the two printed circuit boards (2, 3) has the electrical plug connector (1) and the other printed circuit board (3, 2) has the electrical mating plug connector (22); or (b) are connected together by means of a connecting element (30) according to claim 12, wherein each of the two printed circuit boards (2, 3) has one of the mating plug connectors (22) for connection to one of the electrical plug connectors (1) of the connecting element (30); or (c) have in each case an electrical plug connector (1) according to one of claims 1 to 11, wherein the two plug connectors (1) are connected electrically and mechanically by a connector module, wherein the connector module has a first end and a second end, and wherein an electrical mating plug connector (22) is arranged at each of the two ends which is connected to one of the electrical plug connectors (1).

A further aspect of the present invention is a printed circuit board arrangement (31) characterized in that the connecting element (30) is fixed in a central section (34) between its two ends (32, 33) relative to the first printed circuit board (2) and/or to the second printed circuit board (3), wherein the connecting element (30) is preferably guided through a through bore (36) of a fixing plate (35) fixed relative to the first printed circuit board (2) and/or to the second printed circuit board (3),

BRIEF DESCRIPTIONS OF THE FIGURES

Exemplary embodiments of the invention are described in detail below with the aid of the Figures.

The Figures in each case show preferred exemplary embodiments in which individual features of the present invention are shown in combination with one another. Features of an exemplary embodiment can also be implemented separately from the other features of the same exemplary embodiment and can accordingly be readily combined by a person skilled in the art with features of other exemplary embodiments to form further expedient combinations and sub-combinations.

Functionally identical elements are provided with the same reference numerals in the drawings, in which, schematically:

DETAILED WRITTEN DESCRIPTION OF THE PREFERRED EMBODIMENTS

This disclosure of the invention is submitted in furtherance of the Constitutional purposes of the US Patent Laws "to promote the progress of Science and the useful arts" (Article 1, Section 8).

Figure 1:
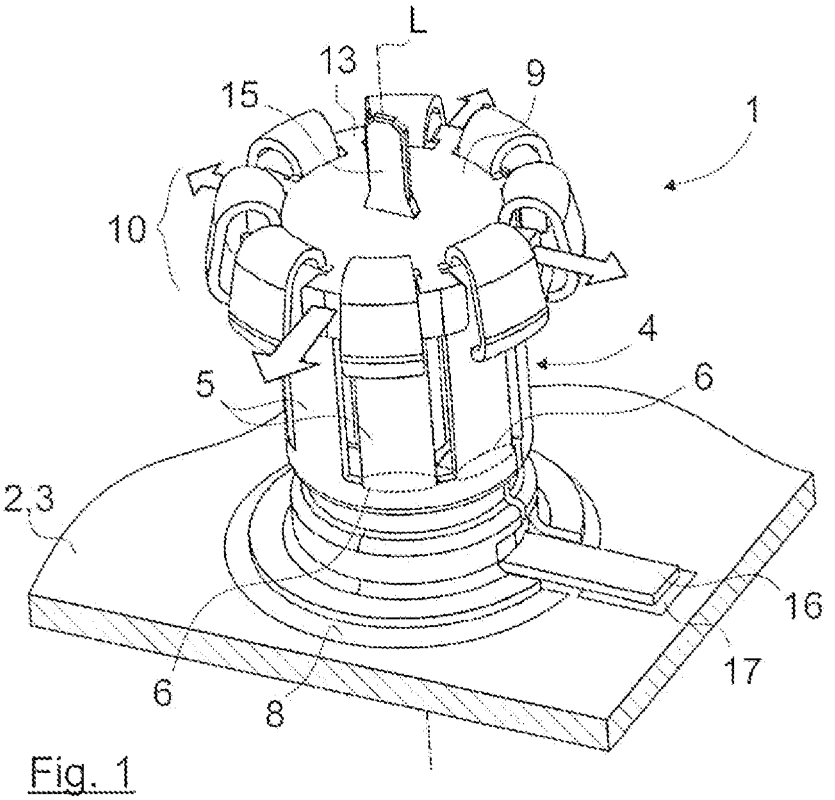
FIG. 1 shows a plug connector according to a first exemplary embodiment of the invention and a printed circuit board in a perspective view.

FIG. 1 shows a plug connector 1 according to a first exemplary embodiment of the invention. The plug connector 1 is suited for connecting any electrical devices, for example for connecting cables, electrical modules, housing parts, and in particular for connecting printed circuit boards 2, 3. A printed circuit board 2, 3 is indicated by way of example in FIG. 1, to which the plug connector 1 is electrically and mechanically connected.

The plug connector 1 has an outer conductor contact element 4 with a plurality of elastic spring tabs 5. The spring tabs 5 are arranged in a circle with a respective rear end 6 annularly around the longitudinal axis L of the plug connector 1. The outer conductor contact element 4 is formed in the exemplary embodiments as a single piece as a spring cage and fastened directly on the printed circuit board 2, 3. The base of the spring cage or the outer conductor contact element 4 can be fastened, for example soldered, on a corresponding contact surface 8 (cf FIG. 1) of the printed circuit board 2, 3. In this way, direct fastening of the rear ends 6 of the spring tabs 5 on the printed circuit board 2, 3 can be provided.

It can, however, also be provided in principle that the spring tabs 5 do not merge into a common base of a spring cage, as illustrated, and instead are fastened individually on the printed circuit board 2, 3, preferably directly or also indirectly via a further component.

Figure 2:
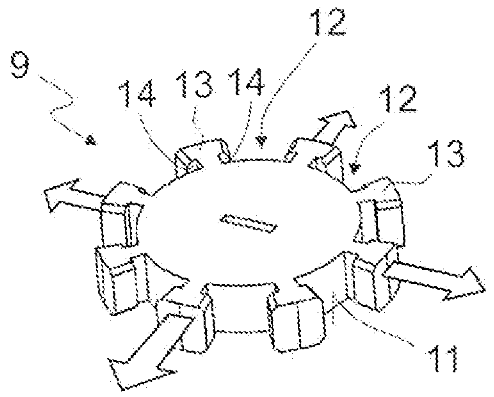
FIG. 2 shows the dielectric support element of the plug connector of FIG. 1 in a perspective individual view.

The plug connector 1 has a dielectric support element 9. The support element 9 is shown in FIG. 2 in a perspective individual view. The spring tabs 5 are supported with their respective front, free end sections 10 (cf, for example, FIG. 1) on an outer shell 11 (cf in particular FIG. 2) of the dielectric support element 9. The support element 9 is displaceable laterally relative to the printed circuit board 2, 3, as indicated with the aid of the arrows in FIGS. 1 and 2. Tilting of the support element 9 can also be provided here, as parallel a displacement as possible being preferred, however.

The support element 9 of the plug connector 1 according to FIG. 1 has passages 12 (cf FIG. 2) which are arranged distributed along its outer shell 11 and in which the respective front end sections 10 of the spring tabs 5 are received.

In the first exemplary embodiment, the passages 12 are formed between spoke- or web-like raised portions 13. The spoke- or web-like raised portions 13 have indentations 14 or undercuts (cf FIG. 2) in order to improve the mechanical connection to the front end section 10 of the spring tabs 5.

In the exemplary embodiment of the invention shown in FIGS. 1 to 6, the spring tabs 5 have a straight profile between the front end section 10 and the rear end 6. In this way, a particularly simple production and good customization of the electrical properties can be enabled. It should be stressed that the spring tabs 5 of the first exemplary embodiment can alternatively also have a curved or other profile.

In the exemplary embodiments, the plug connector 1 furthermore has an inner conductor contact element 15 which extends through the outer conductor contact element 4 and the support element 9. In the exemplary embodiments, the inner conductor contact element 15 is guided coaxially inside the outer conductor contact element 4. However, a plurality of inner conductor contact elements and a non-coaxial orientation inside the outer conductor contact element 4 can also in principle be provided.

The plug connector type illustrated is to be understood purely by way of example; the invention is suited for use with any plug connector types.

Figure 3:
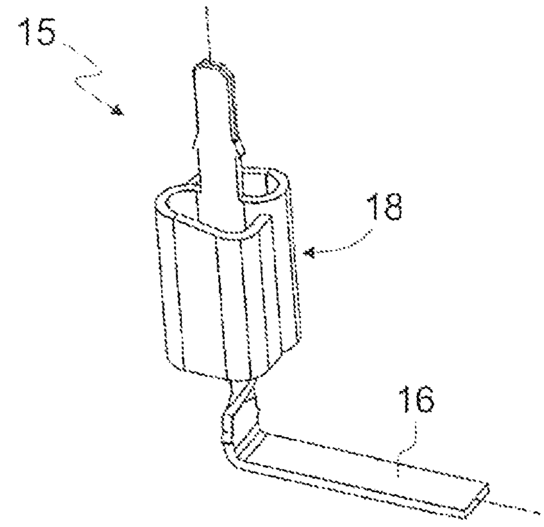
FIG. 3 shows the inner conductor contact element of the plug connector of FIG. 1 in a perspective individual view.
Figure 4:
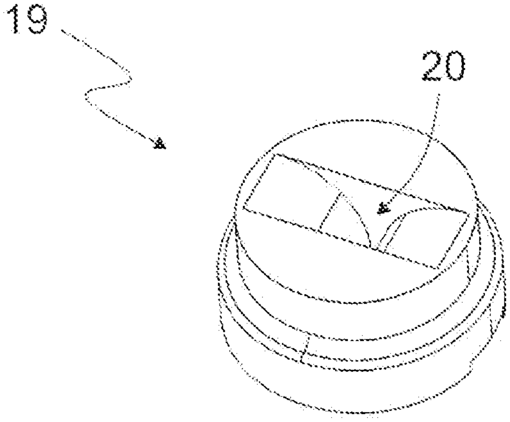
FIG. 4 shows the insulating body of the plug connector of FIG. 1 in a perspective individual view.

In the exemplary embodiments of FIGS. 1 to 11, the inner conductor contact element 15 is formed as a flat contact. However, the inner conductor contact element 15 can in principle also be formed as a pin contact or a socket contact. The inner conductor contact element 15 of the plug connector 1 according to FIG. 1 is shown in FIG. 3 in a perspective individual view. The inner conductor contact element 15 has a contact section 16 for connection to the electrical device or the printed circuit board 2, 3. A connection of the contact section 16 to a soldering surface 17 of the printed circuit board 2, 3 is shown by way of example in FIG. 1.

In the exemplary embodiments, the inner conductor contact element 15 is bent by 90° and is led out of the outer conductor contact element 4. However, the inner conductor contact element 15 can also run in a straight line and be led out of the plug connector 1 or the outer conductor contact element 4, along the longitudinal axis L of the plug connector 1.

In the exemplary embodiments, the inner conductor contact element 15 runs twisted along its longitudinal extent. Twisting by 90° is provided here. In this way, in particular when the inner conductor contact element 15 is formed as a flat contact or has flat sections (as is the case in the exemplary embodiment of FIG. 12), a defined flexibility in two spatial directions is provided. A particularly advantageous articulated connection can result in particular when the twisting, as shown in the exemplary embodiments, runs along as limited an axial section as possible in the region of that end of the inner conductor contact element 15 which faces the printed circuit board 2, 3. The twisting can in particular also be arranged adjoining the (optional) bending point of the inner conductor contact element 15.

A loop structure 18 suited for electrical adaptation to the outer conductor contact element 4 can be provided in a central section of the inner conductor contact element 15.

In the exemplary embodiments, the spring tabs 5 are in addition fastened with their respective rear end 6 on an insulating body 19 accommodated in the outer conductor contact element 4. The insulating body 19 of the first exemplary embodiment is shown by way of example in FIG. 4 in a perspective individual view.

The insulating body 19 is capable of further improving the stability of the outer conductor contact element 4 and furthermore providing a guide for the inner conductor contact element 15. The insulating body 19 can preferably have a guide duct 20 for the inner conductor contact element 15. In the exemplary embodiments, the insulating body 19 is formed as a component which is independent of the dielectric support element 9.

Figure 7:
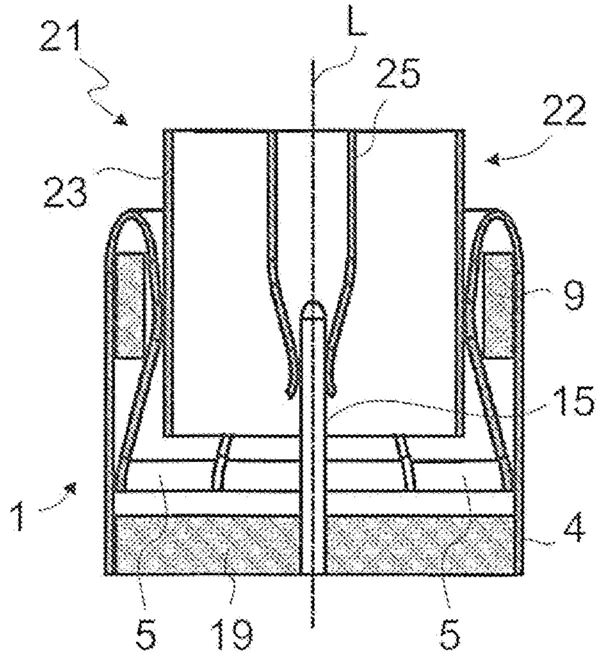
FIG. 7 shows a plug connector according to a second exemplary embodiment of the invention in the plugged state of the mating plug connector in a view in section.

In the exemplary embodiments of the invention shown in FIGS. 1 to 7, the respective front end sections 10 of the spring tabs 5 are bent in the direction of the rear end 6. In the exemplary embodiment of FIGS. 1 to 6, the respective front end sections 10 are bent facing away ("outward") from the longitudinal axis L of the plug connector 1 and, in the exemplary embodiment shown in FIG. 7, are bent in the direction of the longitudinal axis L of the plug connector 1 ("inward").

In particular, when the front end sections 10 are bent in the direction of the longitudinal axis L of the plug connector 1, it can be provided that the spring tabs 5 are turned down over the support element 9, as indicated in FIG. 7. The spring tabs 5 are preferably here bent in such a way that self-contacting or a loop results at the spring tabs 5 (cf FIG. 7).

Figure 5:
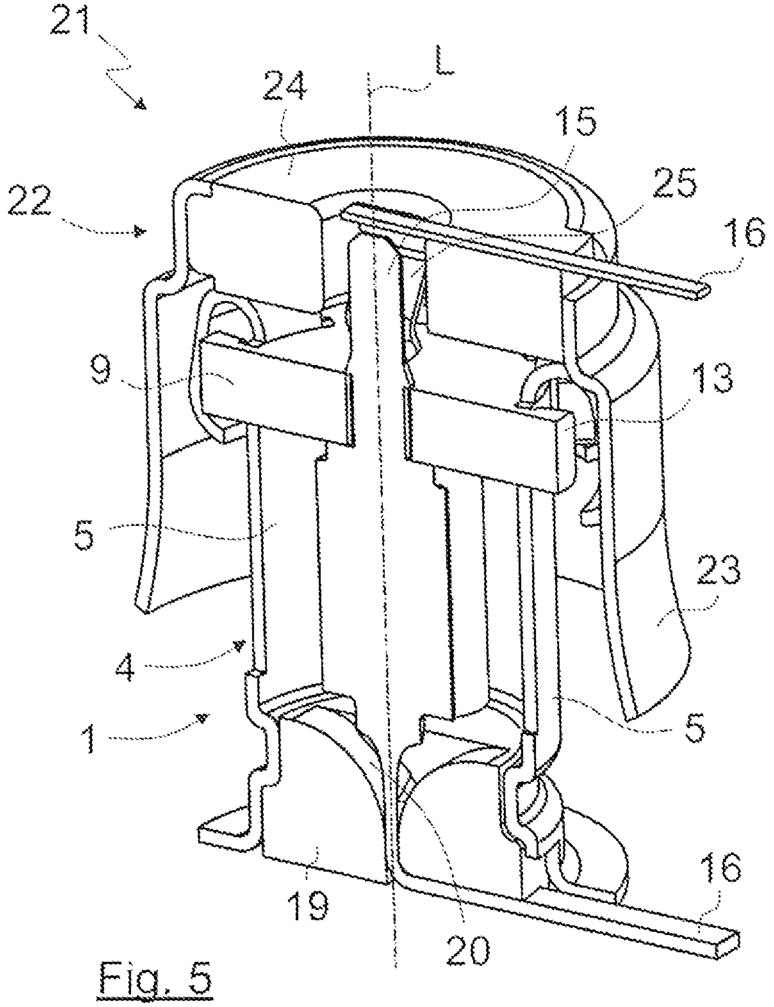
FIG. 5 shows a plug connection consisting of a plug connector according to FIG. 1 and a corresponding mating plug connector in a perspective view in section.
Figure 6:
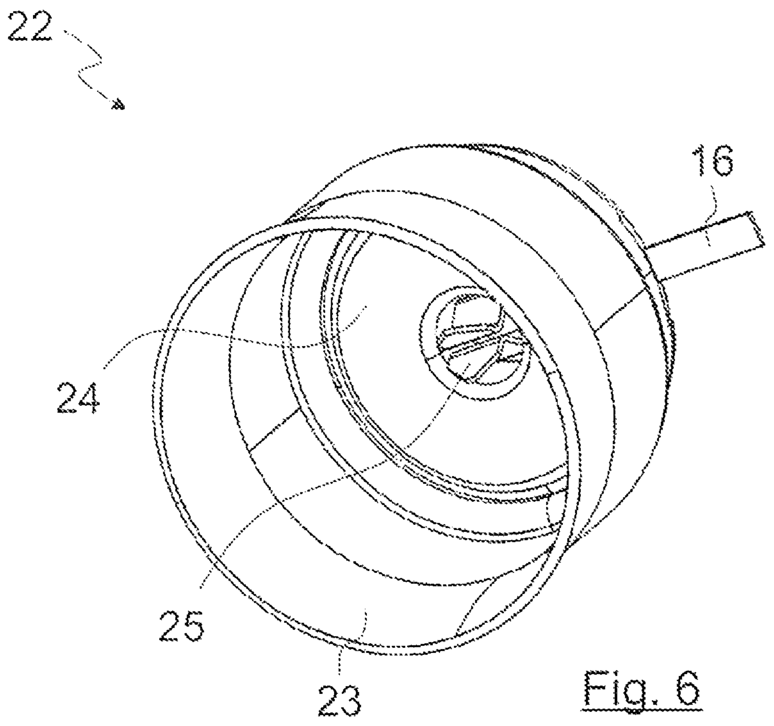
FIG. 6 shows the mating plug connector of the plug connection according to FIG. 5 in a perspective individual view.

A plug connection 21 consisting of the plug connector 1 of FIG. 1 and a corresponding mating plug connector 22 is shown in FIG. 5 in a perspective view in section. The mating plug connector 22 is furthermore shown in an individual view in FIG. 6.

The mating plug connector 22 has a bell-like outer conductor 23 or an outer conductor with a guide funnel for the plug connector 1. The mating plug connector 22 furthermore has an insulator 24 which electrically insulates the outer conductor 23 from an inner conductor 25 and which guides the inner conductor 25 coaxially inside the outer conductor 23. The inner conductor 25 of the mating plug connector 22 is formed by two opposite contact springs between which the inner conductor contact element 15 of the plug connector 1 can be introduced. The mating plug connector 22 can also be connected electrically and mechanically to a corresponding electrical device, in particular an electrical printed circuit board 2, 3. The inner conductor 25 of the mating plug connector 22 has for this purpose a contact section 16, by way of example.

A further exemplary embodiment of the plug connector 1 according to the invention is shown in FIGS. 8 to 11. The spring tabs 5 of the outer conductor contact element 4 have a curved profile (similar to an S curve), which further improves the customizability of the outer conductor contact element 4 (a straight or other profile can, however, alternatively also be provided). The spring tabs 5 furthermore have a twisted profile in the region of the front end section 10 along their longitudinal extent. The contact force of the spring tabs 5 can thus be generated from the torsional resistance and hence configured largely independently of the bending strength.

Figure 8:
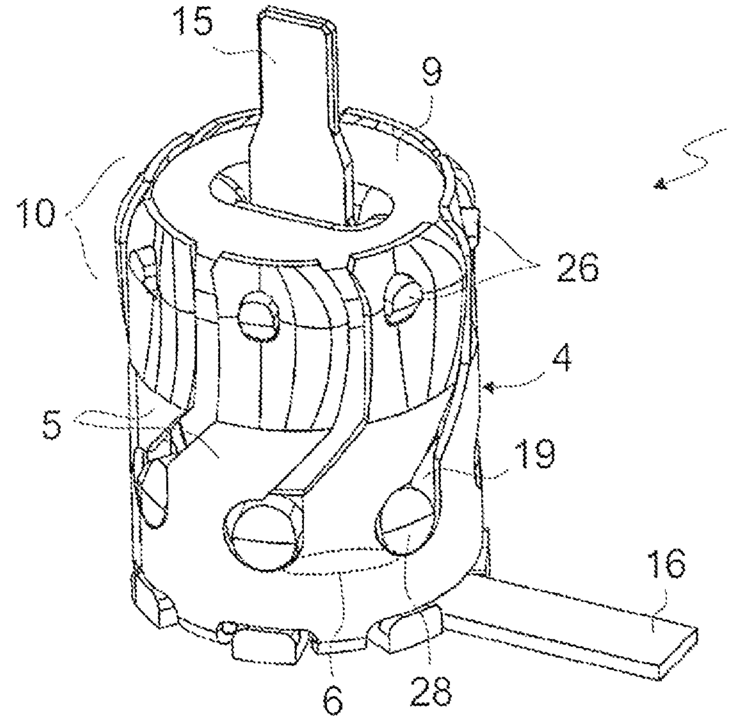
FIG. 8 shows a plug connector according to a third exemplary embodiment of the invention in a perspective view.
Figure 9:
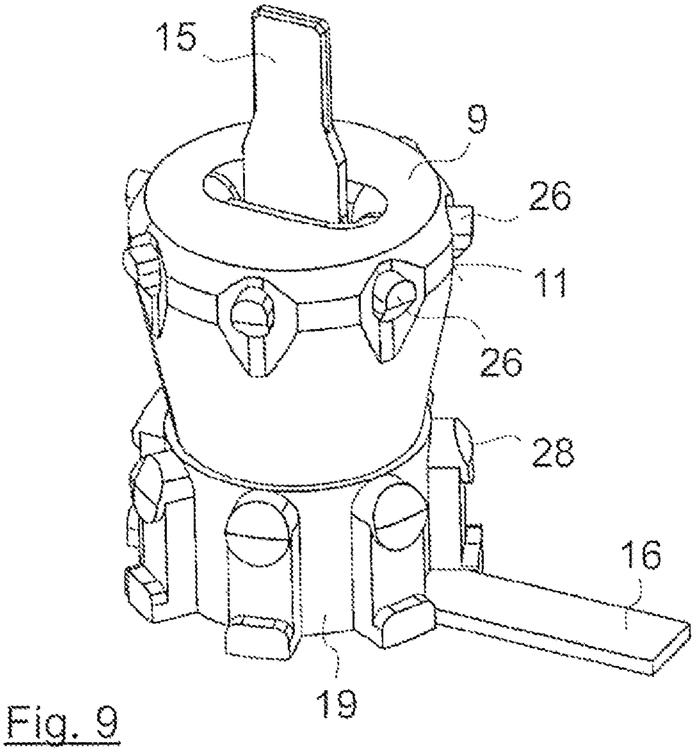
FIG. 9 shows the plug connector of FIG. 8 with the outer conductor contact element blanked out, in a perspective individual view.
Figure 10:
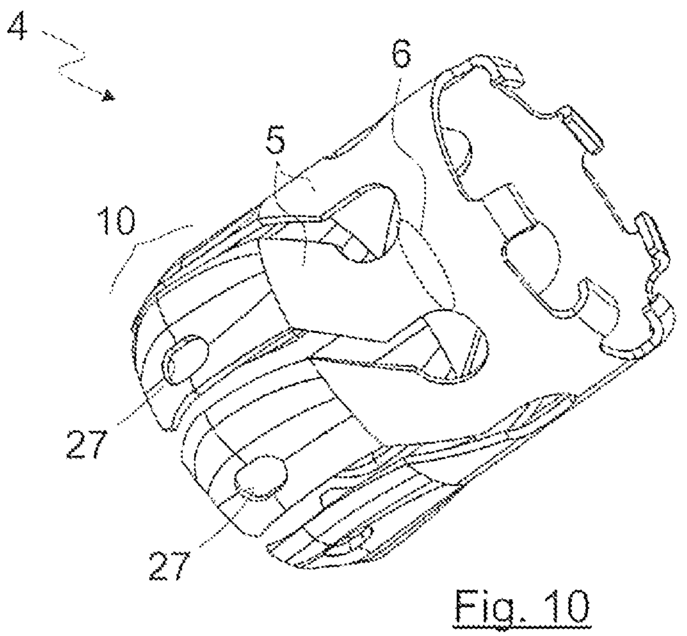
FIG. 10 shows the outer conductor contact element of the plug connector of FIG. 8 in a perspective individual view.
Figure 11:
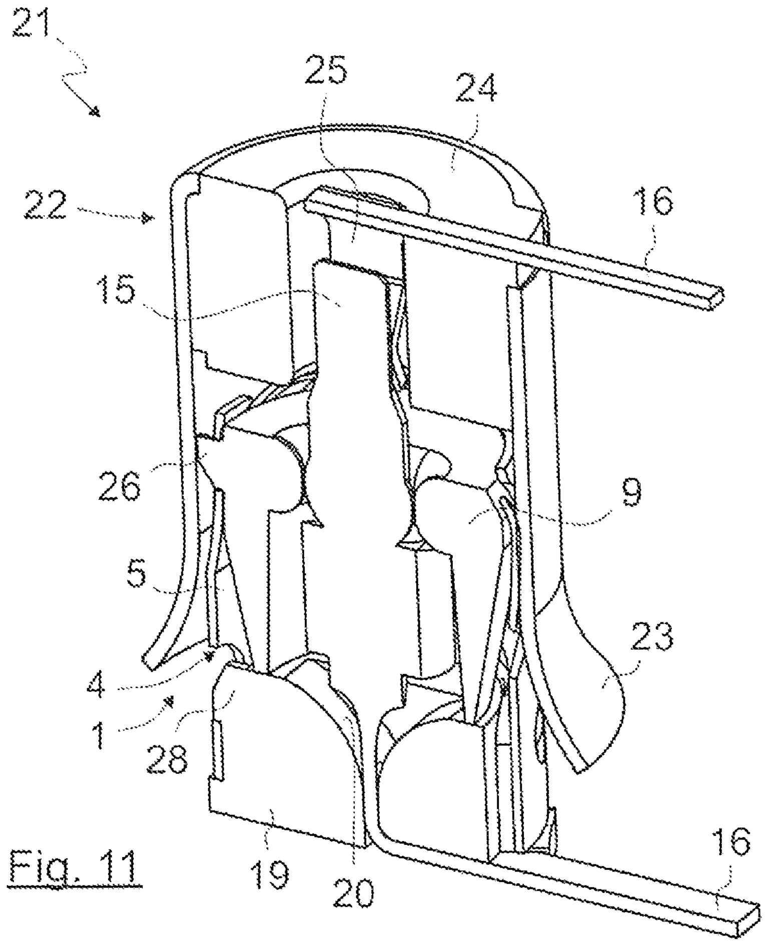
FIG. 11 shows a plug connection consisting of a plug connector according to FIG. 9 and a corresponding mating plug connector in a perspective view in section.

Guide bodies 26, into which the respective spring tabs 5 are hooked, are provided on the outer shell 11 of the support element 9 (cf in particular FIG. 8 in conjunction with FIG. 9 which shows the plug connector 1 with the outer conductor contact element 4 blanked out). Lateral displacement of the spring tabs 5 can consequently be guided even better. The spring tabs 5 can have corresponding recesses 27 for the guide bodies 26 (cf FIG. 10). The guide bodies 26 can furthermore advantageously form an end stop for the lateral displacement of the support element 9 inside the outer conductor 23 of the mating plug connector 22. Alternatively, the spoke-like or web-like raised portions 13 of the first exemplary embodiment can, for example, form a corresponding end stop.

An insulating body 19 is also provided in the exemplary embodiment of FIGS. 8 to 11 in order to support the outer conductor contact element 4 in the region of the rear ends 6 of the spring tabs 5 and in order to fix the spring tabs 5 in a twist-proof manner on the insulating body 19. The insulating body 19 has web-like latching elements 28 on its outer shell for twist-proof fixing in the region of the rear ends 6 of the spring tabs 5.

Figure 12:
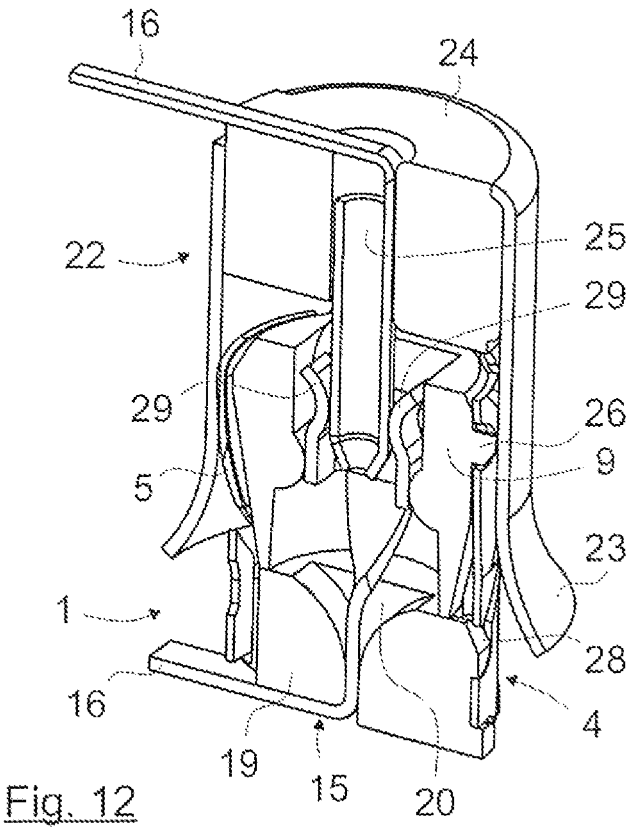
FIG. 12 shows a plug connection according to a fourth exemplary embodiment of the invention in a perspective view in section.

A preferred embodiment of the invention is shown in FIG. 12. The exemplary embodiment of FIG. 12 is similar in principle to the exemplary embodiment of FIGS. 8 to 11. However, the inner conductor contact element 15 is formed in the manner of a socket and has two opposite contact springs 29 in order to contact a corresponding inner conductor 25 (for example, the pin contact illustrated) of the mating plug connector 22. The inner conductor contact element 15 is protected in the outer conductor contact element 4 and does not protrude from the plug connector 1. A structure of this type, which is suited in particular (but not exclusively) for a socket-type design of the inner conductor contact element 15, is also provided for the connecting element 30 described below. It should be stressed at this point that a socket-type inner conductor contact element 15 can also protrude from the outer conductor contact element 4 and that a pin-shaped inner conductor contact element 15 can also optionally be accommodated completely in the outer conductor contact element 4.

Figure 13:
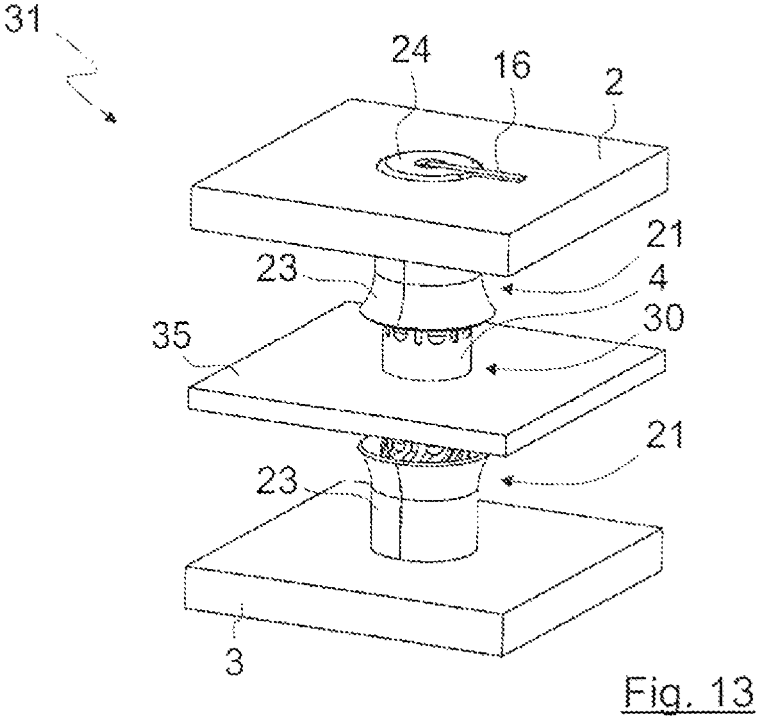
FIG. 13 shows a printed circuit board arrangement with two printed circuit boards connected together via a connecting element, and a fixing plate in a perspective view.
Figure 14:
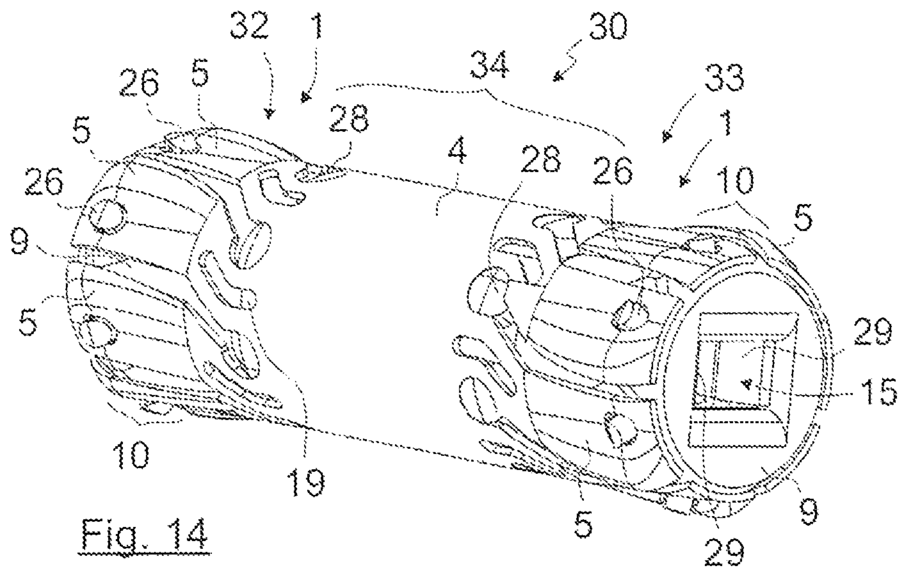
FIG. 14 shows the connecting element of the printed circuit board arrangement of FIG. 13 in a perspective individual view.

FIG. 13 shows a printed circuit board arrangement 31 consisting of a first printed circuit board 2 and a second printed circuit board 3 electrically and mechanically connected to the first printed circuit board 2. The two printed circuit boards 2, 3 are connected together by means of a connecting element 30, wherein each of the two printed circuit boards 2, 3 has a mating plug connector 22 for connection to a plug connector 1 of the connecting element 30. The connecting element 30 is illustrated separately in FIG. 14 and is described below.

It should be mentioned at this point that the connection between the two printed circuit boards 2, 3 can also be effected directly, wherein in this case one of the two printed circuit boards 2, 3 has the plug connector 1 and the other printed circuit board 3, 2 has the mating plug connector 22. A direct connection between the two printed circuit boards 2, 3 is in principle preferred, as long as it is practically possible. An indirect connection by means of the connecting element 30 illustrated is, however, also provided.

Figure 15:
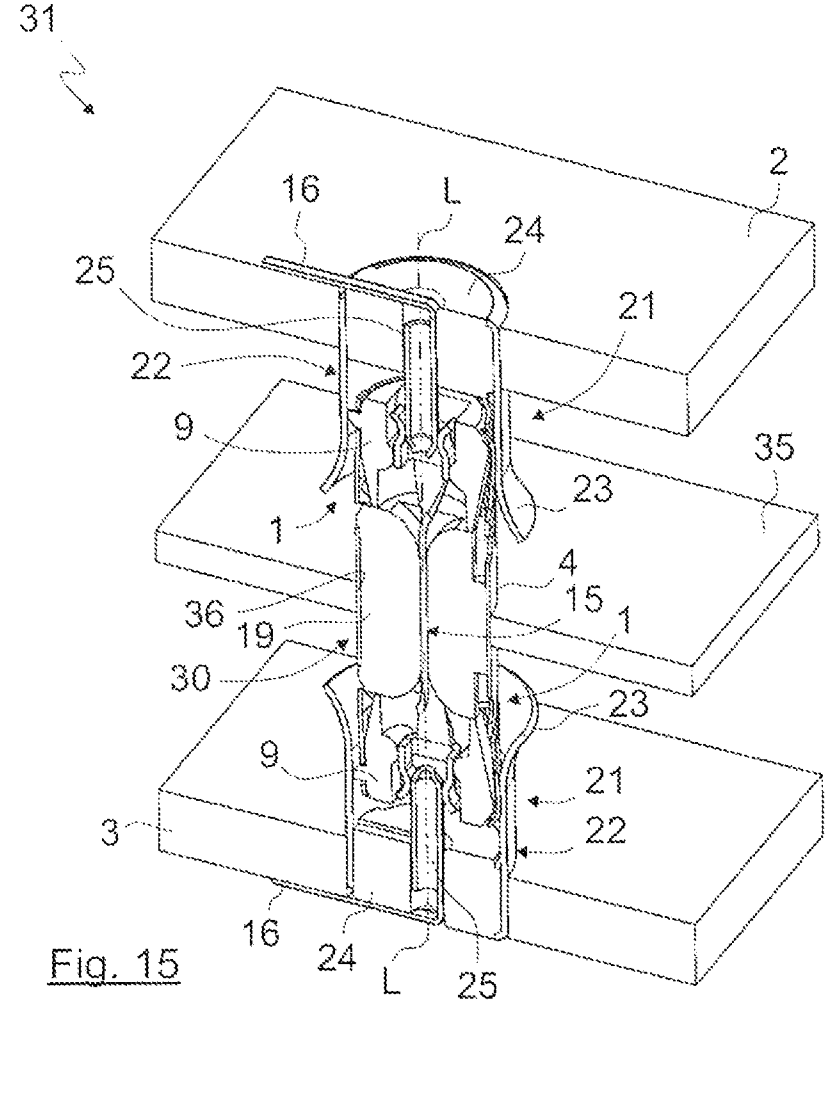
FIG. 15 shows the printed circuit board arrangement of FIG. 13 in a perspective view in section with no radial misalignment between the printed circuit boards.
Figure 16:
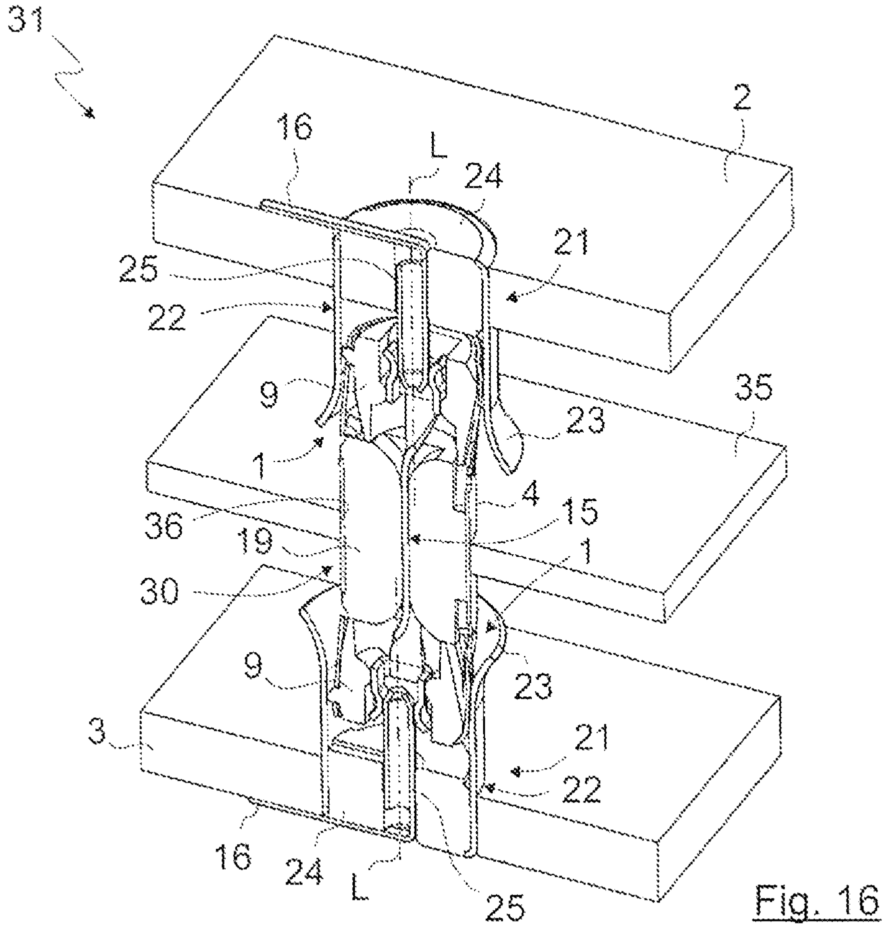
FIG. 16 shows the printed circuit board arrangement of FIG. 13 in a perspective view in section with a compensated radial misalignment between the printed circuit boards.

As can be clearly seen in FIGS. 13, 15, and 16, the mating plug connector 22 (or possibly also the plug connector 1) can also be received in a passage of the printed circuit board 2, 3 or the electrical device for the purpose of being fastened to the printed circuit board 2, 3 (or to another electrical device). Hence it is not a requirement that the mating plug connector 22 or the plug connector 1 must be fitted on the printed circuit board 2, 3 or on the electrical device, as indicated in FIG. 1.

A connecting element 30 for connecting two printed circuit boards 2, 3 is also known by the term "bullet" or "adapter". As can be seen particularly clearly in conjunction with FIG. 14, the connecting element 30 proposed in the present case can have a first end 32 and a second end 33, wherein a plug connector 1 is formed at each of the two ends 32, 33. The plug connector 1 is by way of example formed in the manner of the plug connector 1 already described in connection with FIG. 12. However, any of the plug connectors 1 described above and below can in principle be provided in order to connect the respective end 32, 33 of the connecting element 30 to a mating plug connector 22 of the electrical device or the printed circuit board 2, 3.

The connecting element 30 has a central section 34 along which the two outer conductor contact elements 4, designed as a single piece, of the plug connector 1 are connected together rigidly or in the form of a tube. The respective insulating bodies 19 and the inner conductor contact elements 15 of the plug connectors 1 are also formed as a single piece.

The printed circuit board arrangement 31 of FIG. 13 is shown in FIGS. 15 and 16 in a perspective view in section. FIG. 15 here shows a coaxial orientation in which there is no misalignment between the two printed circuit boards 2, 3. A radial misalignment between the two printed circuit boards 2, 3 or between the mating plug connectors 22 of the respective printed circuit board 2, 3 is shown in FIG. 16. It can be seen here how the misalignment can be compensated according to the invention by means of the connecting element 30.

In order to prevent tilting of the connecting element 30, a fixing plate 35 can optionally be provided which is fixed relative to the first printed circuit board 2 and/or to the second printed circuit board 3 (the fixing is not shown). The fixing plate 35 can have a through bore 36 through which the connecting element 30 passes, as a result of which the connecting element 30 is ultimately fixed in its central section 34 relative to the first printed circuit board 2 and/or to the second printed circuit board 3. A misalignment between the printed circuit boards 2, 3 can thus be compensated preferably only in the region of the two ends 32, 33 of the connecting element 30 by the dielectric support element 9 being displaced correspondingly.

Figure 17:
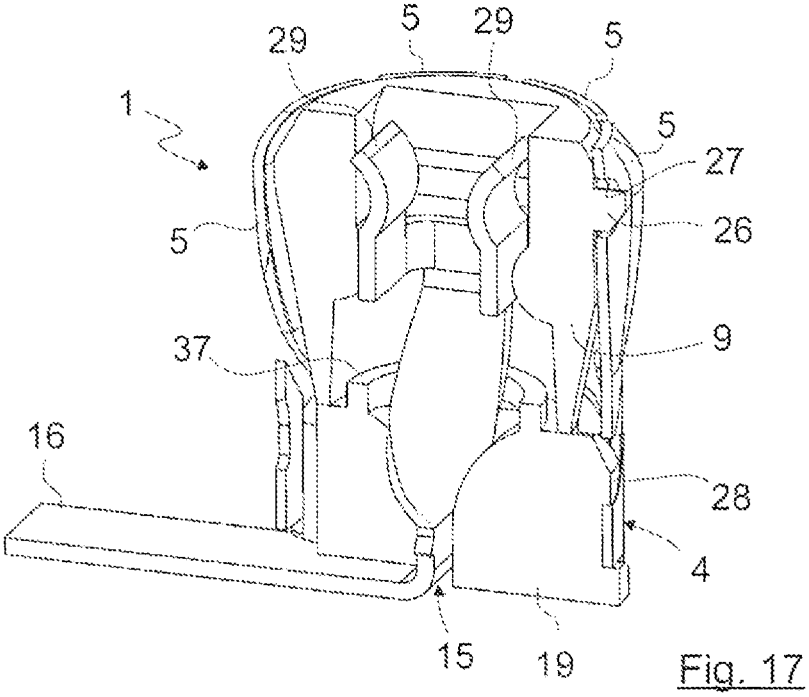
FIG. 17 shows a plug connector according to a fifth exemplary embodiment of the invention in a perspective view in section.

FIG. 17 shows a fifth exemplary embodiment of the plug connector 1 according to the invention in a perspective view in section. The plug connector 1 illustrated corresponds essentially to the plug connector 1 of the fourth exemplary embodiment of FIG. 12 but has a further stop element in order to predetermine a maximum deflection for the support element 9 and the spring tabs 5. The additional stop element is formed as an annular circular limiting element 37 on an end face, facing the support element 9, of the insulating body 19. An end stop for the lateral displacement of the support element 9 relative to the insulating body 19 is provided by the annular limiting element 37, as a result of which a maximum deflection of the spring tabs 5 (and hence the mechanical overloading thereof) can also be limited in the unplugged state or independently of the mating plug connector 22. In the exemplary embodiment of FIG. 17, the annular limiting element 37 is arranged inside the support element 9. The limiting element 37 can alternatively or additionally also be arranged outside the support element 9 or encircle the support element 9. As an alternative to an annular limiting element 37, individual webs or pins can of course also be provided which are arranged inside and/or outside the support element 9. A limiting element 37 can in principle also be provided for all the above described exemplary embodiments.

Operation

Having described the structure of our Electrical Plug Connector, Connecting Element, and Printed Circuit Board Arrangement, its operation is briefly described.

A principal object of the present invention is to provide an electrical plug connector for an electrical device, the electrical plug connector comprising: an outer conductor contact element (4) that defines a longitudinal axis and has a plurality of spacedly arrayed elastic spring tabs (5); and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element, and the respective rear end is fastened to the electrical device and is arranged annularly about the longitudinal axis; and wherein the dielectric support element is displaceable laterally relative to the electrical device.

A further object of the present invention is to provide an electrical plug connector wherein the plurality of spacedly arrayed elastic spring tabs (5) are each supported with the respective front, free end section (10) laterally on an outer shell (11) of the dielectric support element (9).

A further object of the present invention is to provide an electrical plug connector and further comprising: an insulating body accommodated in the outer conductor contact element; and the plurality of spacedly arrayed elastic spring tabs (5) are each fastened with their respective rear end (6) on the insulating body (19) and, the insulating body (19) has latching elements which can be inserted into corresponding latching recesses defined in the outer conductor contact element (4) to enable radial, rotational, and/or axial fixing of the outer conductor contact element (4) on the insulating body (19).

A further object of the present invention is to provide an electrical plug connector wherein the respective front free end sections (10) of each of the plurality of spacedly arrayed elastic spring tabs (5) are bent in a direction toward the rear end (6), and wherein the respective front free end sections (10) are bent so that the respective front free end sections face away from the longitudinal axis (L) of the electrical plug connector; (1); or the respective front free end sections are bent in a direction toward the longitudinal axis (L) of the electrical plug connector.

A further object of the present invention is to provide an electrical plug connector wherein the dielectric support element (9) has laterally arranged passages (12) in which the respective front free end sections (10) of the plurality of spacedly arrayed elastic spring tabs (5) are received.

A further object of the present invention is to provide an electrical plug connector wherein the plurality of spacedly arrayed elastic spring tabs (5) form a twisted profile along the longitudinal axis.

A further object of the present invention is to provide an electrical plug connector wherein the respective front free end sections (10) of each of the plurality of spacedly arrayed elastic spring tabs (5) define recesses, and the defined recesses hook (27) into guide bodies (26) that project laterally from the dielectric support element (9).

A further object of the present invention is to provide an electrical plug connector wherein the plurality of spacedly arrayed elastic spring tabs (5) form a straight profile, or a curved profile, or a stepped profile between the front free end section (10) and the rear end (6).

A further object of the present invention is to provide an electrical plug connector and further comprising: an inner conductor contact element (15) which extends through the outer conductor contact element (4) and the dielectric support element (9); and wherein the inner conductor contact element (15) forms a twisted profile along its longitudinal extent.

A further object of the present invention is to provide an electrical plug connector wherein the plurality of spacedly arrayed elastic spring tabs (5) and the inner conductor contact element (15) are twisted in the same direction of rotation.

A further object of the present invention is to provide an electrical plug connector and further comprising a stop element to predetermine a maximum deflection for the dielectric support element (9) and the plurality of spacedly arrayed elastic spring tabs (5); and wherein the stop elements element is formed by raised portions (13) projecting laterally from the dielectric support element (9).

A further object of the present invention is to provide a connecting element (30) for producing an electrical and mechanical connection between two electrical devices (2, 3), the connecting element comprising: a first end (32); and a second end (33); and a first electrical plug connector and a second electrical plug connector; and wherein each of the first and second electrical plug connectors comprise an electrical plug connector an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element and the respective rear end is fastened to the electrical device and is arranged annularly about the longitudinal axis; and wherein the dielectric support element is displaceable laterally relative to the electrical device; and the first end has the first electrical plug connector and the second end has the second electrical plug connector (1) to connect the respective first and second end (32, 33) to an electrical mating plug connector (22) of the electrical device (2, 3) associated with the respective end (32, 33).

A further object of the present invention is to provide a printed circuit board arrangement (31) comprising: a first electrical printed circuit board (2); and a second electrical printed circuit board (3) connected electrically and mechanically to the first electrical printed circuit board (2); and a connecting element for producing an electrical and mechanical connection between the first and the second electrical printed circuit board, the connecting element comprising; a first end; a second end; a first electrical plug connector and a second electrical plug connector, each of the first and second plug connectors comprising: an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board; and the first end of the connecting element has the first electrical plug connector and the second end of the connecting element has the second electrical plug connector; and wherein each of the first and the second electrical printed circuit boards (2, 3) comprises a respective electrical mating plug connector, and wherein the first and the second electrical printed circuit boards are connected together by means of the connecting element, in that the electrical mating plug connector of the first electrical circuit board is connected to the first electrical plug connector of the connecting element and the electrical mating plug connector of the second electrical circuit board is connected to the second electrical plug connector of the connecting element.

A further object of the present invention is to provide a printed circuit board arrangement (31) wherein the connecting element (30) is fixed in a central section (34) between the first and second ends (32, 33) relative to the first electrical printed circuit board (2) and relative to the second electrical printed circuit board (3), and wherein the connecting element (30) is guided through a through bore (36) of defined in a fixing plate (35) that is fixed relative to the first electrical printed circuit board (2) and relative to the second electrical printed circuit board (3).

A further object of the present invention is to provide an electrical plug connector wherein each of the plurality of spacedly arrayed elastic spring tabs is directly connected to the electrical device.

A further object of the present invention is to provide an electrical plug connector and further comprising: an end stop to limit lateral displacement of the dielectric support element relative to the insulating body; and wherein the end stop is formed by limiting elements on an end side, facing the dielectric support element of the insulating body and/or which are arranged on an end side, facing the insulating body, of the dielectric support element.

A further object of the present invention is to provide an electrical plug connector wherein each of the plurality of spacedly arrayed elastic spring tabs is indirectly connected to the electrical device.

A further object of the present invention is to provide an electrical plug connector wherein the outer conductor contact element is radially, or rotationally, or axially fixed on the insulating body.

A further object of the present invention is to provide a printed circuit board arrangement comprising: a first electrical printed circuit board; and a second electrical printed circuit board connected electrically and mechanically to the first electrical printed circuit board; and wherein the first and the second electrical printed circuit boards form a common electrical plug connection, wherein one of the first or second electrical printed circuit boards has an electrical plug connector and the other of the first or second electrical printed circuit board has an electrical mating plug connector, the electrical plug connector comprising an outer conductor contact element that defines a longitudinal axis and has a plurality of spacedly arrayed elastic spring tabs; and wherein each of the plurality of spacedly arrayed elastic spring tabs has a rear end, and front free end section; the electrical plug connector further comprising a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board.

A further object of the present invention is to provide a printed circuit board arrangement comprising: a first electrical printed circuit board; a second electrical printed circuit board connected electrically and mechanically to the first electrical printed circuit board; and a connector module having a first end and a second end, wherein a respective electrical mating plug connector is arranged at each of the first end and the second end; and wherein the first electrical printed circuit board has a first electrical plug connector, and the second electrical printed circuit board has a second electrical plug connector, each of the first and second electrical plug connectors comprises an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board, wherein the first and second electrical plug connectors are connected electrically and mechanically by the connector module, in that the electrical mating plug connector of the first end of the connector module is connected to the first electrical plug connector and the electrical mating plug connector of the second end of the connector module is connected to the second electrical plug connector.

A still further object of the present invention is to provide an electrical plug connector wherein the respective front free end sections of each of the plurality of spacedly arrayed elastic spring tabs are bent in a direction toward the rear end, and wherein the respective front free end sections are bent in a direction toward the longitudinal axis (L) of the electrical plug connector.

An even still further object of the present invention is to provide an electrical plug connector wherein each of the plurality of spacedly arrayed elastic spring tabs are turned down over the dielectric support element.

An even still further object of the present invention is to provide an electrical plug connector and further comprising: guide bodies which project laterally from the dielectric support element and form an end stop for limiting lateral displacement of the dielectric support element inside an outer conductor of a mating plug connector.

In compliance with the statute, the present invention has been described in language more or less specific, as to structural and methodical features. It is to be understood, however, that the invention is not limited to the specific features shown and described since the means herein disclosed comprise preferred forms of putting the invention into effect. The invention is, therefore, claimed in any of its forms or modifications within the proper scope of the appended claims appropriately interpreted in accordance with the Doctrine of Equivalents.

The invention claimed is:

1. An electrical plug connector for an electrical device, the electrical plug connector comprising:

an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element, and the respective rear end is fastened to the electrical device and is arranged annularly about the longitudinal axis; and wherein the dielectric support element is displaceable laterally relative to the electrical device.

2. The electrical plug connector as claimed in claim 1 and wherein the plurality of spacedly arrayed elastic spring tabs are each supported with the respective front, free end section laterally on an outer shell of the dielectric support element.

3. The electrical plug connector as claimed in claim 1 and further comprising:

an insulating body accommodated in the outer conductor contact element; and the plurality of spacedly arrayed elastic spring tabs are each fastened with their respective rear end on the insulating body and, the insulating body has latching elements which can be inserted into corresponding latching recesses defined in the outer conductor contact element to enable fixing of the outer conductor contact element on the insulating body.

4. The electrical plug connector as claimed in claim 1 and wherein the respective front free end sections of each of the plurality of spacedly arrayed elastic spring tabs are bent in a direction toward the rear end, and wherein the respective front free end sections are bent so that the respective front free end sections face away from the longitudinal axis (L) of the electrical plug connector.

5. The electrical plug connector as claimed in claim 1 and wherein the dielectric support element has laterally arranged passages in which the respective front free end sections of the plurality of spacedly arrayed elastic spring tabs are received.

6. The electrical plug connector as claimed in claim 1 and wherein the plurality of spacedly arrayed elastic spring tabs form a twisted profile along the longitudinal axis.

7. The electrical plug connector as claimed in claim 1 and wherein the respective front free end sections of each of the plurality of spacedly arrayed elastic spring tabs define recesses, and the defined recesses hook into guide bodies that project laterally from the dielectric support element.

8. The electrical plug connector as claimed in claim 1 and wherein the plurality of spacedly arrayed elastic spring tabs form a straight profile, or a curved profile, or a stepped profile between the front free end section and the rear end.

9. The electrical plug connector as claimed in claim 1 and further comprising:

an inner conductor contact element which extends through the outer conductor contact element and the dielectric support element; and wherein the inner conductor contact element forms a twisted profile along its longitudinal extent.

10. The electrical plug connector as claimed in claim 9 and wherein the plurality of spacedly arrayed elastic spring tabs and the inner conductor contact element are twisted in the same direction of rotation.

11. The electrical plug connector as claimed in claim 1 and further comprising:

a stop element to predetermine a maximum deflection for the dielectric support element and the plurality of spacedly arrayed elastic spring tabs; and wherein the stop element is formed by raised portions projecting laterally from the dielectric support element.

12. A connecting element for producing an electrical and mechanical connection between two electrical devices, the connecting element comprising:

a first end; and a second end; and a first electrical plug connector and a second electrical plug connector; and wherein each of the first and second electrical plug connectors comprise an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element and the respective rear end is fastened to the electrical device and is arranged annularly about the longitudinal axis; and wherein the dielectric support element is displaceable laterally relative to the electrical device; and the first end has the first electrical plug connector and the second end has the second electrical plug connector to connect the respective first and second end to an electrical mating plug connector of the electrical device associated with the respective end.

13. A printed circuit board arrangement comprising:

a first electrical printed circuit board; and a second electrical printed circuit board connected electrically and mechanically to the first electrical printed circuit board; and a connecting element for producing an electrical and mechanical connection between the first and the second electrical printed circuit board, the connecting element comprising;

a first end; a second end; a first electrical plug connector and a second electrical plug connector, each of the first and second plug connectors comprising: an outer conductor contact element that defines a longitudinal axis and has a plurality of spacedly arrayed elastic spring tabs; and wherein each of the plurality of spacedly arrayed elastic spring tabs has a rear end, and front free end section; and a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board; and the first end of the connecting element has the first electrical plug connector and the second end of the connecting element has the second electrical plug connector; and wherein each of the first and the second electrical printed circuit boards comprises a respective electrical mating plug connector, and wherein the first and the second electrical printed circuit boards are connected together by means of the connecting element, in that the electrical mating plug connector of the first electrical circuit board is connected to the first electrical plug connector of the connecting element and the electrical mating plug connector of the second electrical circuit board is connected to the second electrical plug connector of the connecting element.

14. The printed circuit board arrangement as claimed in claim 13 and wherein the connecting element is fixed in a central section between the first and second ends relative to the first electrical printed circuit board and relative to the second electrical printed circuit board, and wherein the connecting element is guided through a through bore defined in a fixing plate that is fixed relative to the first electrical printed circuit board and relative to the second electrical printed circuit board.

15. The electrical plug connector as claimed in claim 1 and wherein each of the plurality of spacedly arrayed elastic spring tabs is directly connected to the electrical device.

16. The electrical plug connector as claimed in claim 1 and further comprising:

an end stop to limit lateral displacement of the dielectric support element relative to the insulating body; and wherein the end stop is formed by limiting elements on an end side, facing the dielectric support element of the insulating body and/or which are arranged on an end side, facing the insulating body, of the dielectric support element.

17. The electrical plug connector as claimed in claim 1 and wherein each of the plurality of spacedly arrayed elastic spring tabs is indirectly connected to the electrical device.

18. The electrical plug connector as claimed in claim 1 and wherein the outer conductor contact element is radially, or rotationally, or axially fixed on the insulating body.

19. A printed circuit board arrangement comprising:

a first electrical printed circuit board; and a second electrical printed circuit board connected electrically and mechanically to the first electrical printed circuit board; and wherein the first and the second electrical printed circuit boards form a common electrical plug connection, wherein one of the first or second electrical printed circuit boards has an electrical plug connector and the other of the first or second electrical printed circuit board has an electrical mating plug connector, the electrical plug connector comprising an outer conductor contact element that defines a longitudinal axis and has a plurality of spacedly arrayed elastic spring tabs; and wherein each of the plurality of spacedly arrayed elastic spring tabs has a rear end, and front free end section; the electrical plug connector further comprising a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board.

20. A printed circuit board arrangement comprising:

a first electrical printed circuit board;

a second electrical printed circuit board connected electrically and mechanically to the first electrical printed circuit board; and a connector module having a first end and a second end, wherein a respective electrical mating plug connector is arranged at each of the first end and the second end; and wherein the first electrical printed circuit board has a first electrical plug connector, and the second electrical printed circuit board has a second electrical plug connector, each of the first and second electrical plug connectors comprises an outer conductor contact element that defines a longitudinal axis and has a plurality of spacedly arrayed elastic spring tabs; and wherein each of the plurality of spacedly arrayed elastic spring tabs has a rear end, and front free end section;

and a dielectric support element; and wherein each of the spacedly arrayed elastic spring tabs is supported with the respective front, free end section laterally on the dielectric support element and the respective rear end is fastened to the respective electrical printed circuit board and is arranged annularly about the longitudinal axis; and wherein the dielectric support element is displaceable laterally relative to the respective electrical printed circuit board, wherein the first and second electrical plug connectors are connected electrically and mechanically by the connector module, in that the electrical mating plug connector of the first end of the connector module is connected to the first electrical plug connector and the electrical mating plug connector of the second end of the connector module is connected to the second electrical plug connector.

21. The electrical plug connector as claimed in claim 1 and wherein the respective front free end sections of each of the plurality of spacedly arrayed elastic spring tabs are bent in a direction toward the rear end, and wherein the respective front free end sections are bent in a direction toward the longitudinal axis (L) of the electrical plug connector.

22. The electrical plug connector as claimed in claim 1 and wherein each of the plurality of spacedly arrayed elastic spring tabs are turned down over the dielectric support element.

23. The electrical plug connector as claimed in claim 1 and further comprising:

guide bodies which project laterally from the dielectric support element and form an end stop for limiting lateral displacement of the dielectric support element inside an outer conductor of a mating plug connector.

* * * * *